US007975719B2

(12) United States Patent

Nederegger et al.

(10) Patent No.: US 7,975,719 B2

(45) Date of Patent: Jul. 12, 2011

(54) AUXILIARY SIDE HOSE CONNECTION FOR DUAL CHAMBER FUEL TANK

(75) Inventors: Matthias Nederegger, Rochester Hills, MI (US); Hugo Ritzenthaler, Rochester Hills, MI (US)

(73) Assignee: Continental Automotive Systems US, Inc., Auburn Hills ( * ) Notice: Subject to any disclaimer, the term of this patent is extended or adjusted under 35 U.S.C. 154(b) by 670 days.

(21) Appl. No.: 11/826,595

(22) Filed: Jul. 17, 2007

(65) Prior Publication Data

US 2009/0020162 A1 Jan. 22, 2009

(51) Int. Cl.

| | |
|---|---|
| ***F17D 1/12*** | (2006.01) |
| ***F04F 5/44*** | (2006.01) |
| ***F16L 3/08*** | (2006.01) |
| ***F16L 33/02*** | (2006.01) |
| ***F16L 35/00*** | (2006.01) |

(52) U.S. Cl. .................... 137/592; 137/565.22; 137/574; 248/70; 248/74.2; 285/257; 285/330; 123/509

(58) Field of Classification Search ............. 137/565.22, 137/574, 592; 285/255, 257, 330; 248/70, 248/74.1, 74.2; 123/468, 469, 509

See application file for complete search history.

(56) References Cited

U.S. PATENT DOCUMENTS

| | | | | |
|---|---|---|---|---|
| 3,108,065 | A * | 10/1963 | McMichael | 210/172.3 |
| 4,071,268 | A * | 1/1978 | Halling et al. | 285/95 |
| 4,641,859 | A * | 2/1987 | Walters | 285/27 |
| 5,102,313 | A | 4/1992 | Szabo | |
| 5,964,485 | A * | 10/1999 | Hame et al. | 285/320 |
| 6,379,200 | B1 | 4/2002 | Hartke et al. | |
| 6,792,923 | B2 * | 9/2004 | Kumagai et al. | 123/509 |
| 6,871,640 | B2 * | 3/2005 | Atwood et al. | 123/509 |
| 6,964,800 | B2 * | 11/2005 | Peduto | 428/36.91 |
| 2004/0182453 | A1 * | 9/2004 | Ida et al. | 137/571 |

FOREIGN PATENT DOCUMENTS

| | | | |
|---|---|---|---|
| JP | 61 113519 | A | 5/1986 |
| JP | 62 083222 | A | 4/1997 |
| WO | WO 0188363 | A | 11/2001 |

* cited by examiner

*Primary Examiner* — John Rivell

*Assistant Examiner* — Atif H Chaudry

(57) ABSTRACT

A hose connection (51) includes mounting structure (32) and suction structure (46) having an axis (B). The suction structure is mounted to the mounting structure such that the suction structure can rotate with respect to the mounting structure about the axis. The hose connection includes a hose (26') coupled to the suction structure.

18 Claims, 4 Drawing Sheets

AUXILIARY SIDE HOSE CONNECTION FOR DUAL CHAMBER FUEL TANK

FIELD OF THE INVENTION

The invention relates to fuel supply systems for automobile vehicles and, more particularly, to hose connection at an auxiliary side of a duel chamber fuel tank.

BACKGROUND OF THE INVENTION

With reference to FIG. 1, a typical fuel system is shown generally indicated at 10, for a vehicle having a dual chamber or saddle type fuel tank 12. The tank 12 includes a primary tank portion 13*a* and an auxiliary tank portion 13*b*. The fuel tank 12 has a bottom wall 14 with a hump 17 formed therein near a center thereof that extends upwardly. The hump 17 thus separates the tank portions 13*a* and 13*b* and accommodates the passing of a drive shaft (not shown) in the conventional manner. A fuel pump 18 is disposed in the primary tank portion 13*a* of the fuel tank 12 to pump fuel therefrom. A first jet pump 20 is also disposed in the primary tank portion 13*a* of the fuel tank 12 and is fluidly connected to the fuel pump 18. A second or transfer jet pump 22 is disposed in the auxiliary tank portion 13*b* and is fluidly connected to a pressure relief valve 24. The fuel system 10 also includes a fuel rail 26 fluidly connected to the fuel pump 18 to distribute fuel to an engine (not shown) of the vehicle. A plurality of fuel injectors 28 are connected to the engine and are fluidly connected to the fuel rail 26 to inject fuel into the engine. In operation, liquid fuel in the fuel tank 12 is pumped by the fuel pump 18 to the fuel rail 26 and fuel injectors 28 into the engine. The first jet pump 20 is used to keep a reservoir 29 filled with fuel and is connected to a constant feed from the fuel pump 18. The second jet pump 22 is driven with pressurized fuel provided by the fuel pump 18 so the jet pump is on continuously to supply fuel.

With these dual jet pump system, there is a significant increase in the number of components and plumbing required. Thus, these systems are quite complicated and certain systems employ expensive quick-connect connectors.

There is a need to provide an improved hose connection for an auxiliary tank portion of a fuel tank.

SUMMARY OF THE INVENTION

An object of the invention is to fulfill the need referred to above. In accordance with the principles of the present invention, this objective is obtained by providing a hose connection having mounting structure and suction structure. The suction structure is mounted to the mounting structure such that the suction structure can rotate with respect to the mounting structure about an axis of the suction structure. The hose connection includes a hose coupled to the suction structure.

In accordance with another aspect of the disclosed embodiment, a fuel supply system includes a fuel tank having a primary portion and an auxiliary portion. A fuel pump assembly is disposed in the primary portion. The fuel pump assembly includes a jet pump. Mounting structure is disposed in the auxiliary portion. Suction structure is mounted to the mounting structure such that the suction structure can rotate with respect to the mounting structure about an axis of the suction structure. A hose is coupled at one end to suction structure and coupled at another end to the jet pump such that fuel in the auxiliary portion of the fuel tank can be drawn by the jet pump through the suction structure and hose to the primary portion of the fuel tank.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
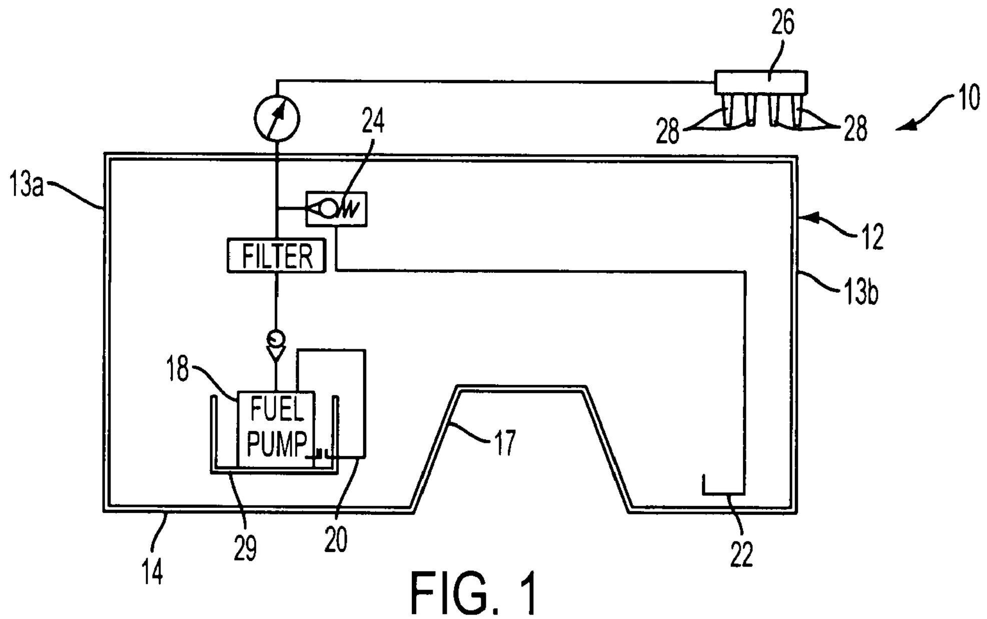
FIG. 1 PRIOR ART
FIG. 1 is a view of conventional saddle-type fuel tank including a fuel pump and first jet pump in a primary tank portion and a secondary jet pump in an auxiliary tank portion.
Figure 2:
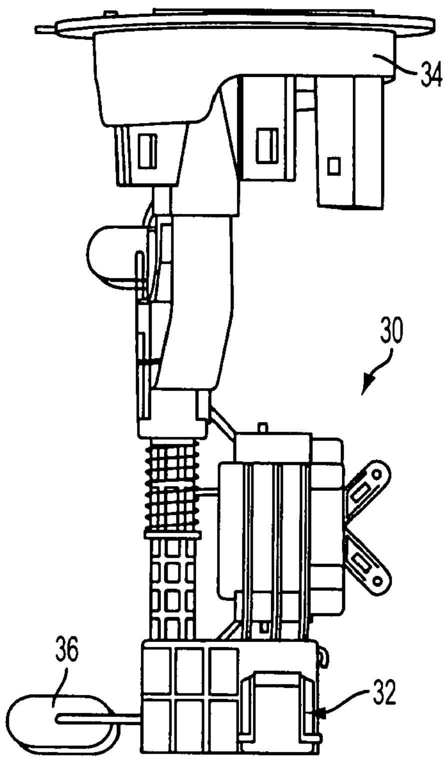
FIG. 2 is a side view of a housing including mounting structure provided in accordance with an embodiment of the invention.

With reference to FIG. 2, a housing, generally indicated at 30, is shown in accordance with the principles of an embodiment of the invention. The housing 30 includes mounting structure, generally indicated at 32, near a bottom thereof, the function of which will be explained below. In the embodiment, the mounting structure 32 is molded integrally with the housing 30 out of plastic material suitable for exposure to fuel. In the embodiment, the housing 30 includes a flange 34 that is constructed and arranged to be mounted to a wall of a fuel tank of the type shown in FIG. 1, such that the housing 30 can be disposed in an auxiliary portion of a saddle-type fuel tank. The flange 34 permits electrical wiring to pass into and out of the tank for powering a conventional level sensor 36 mounted to the housing 30.

Figure 3:
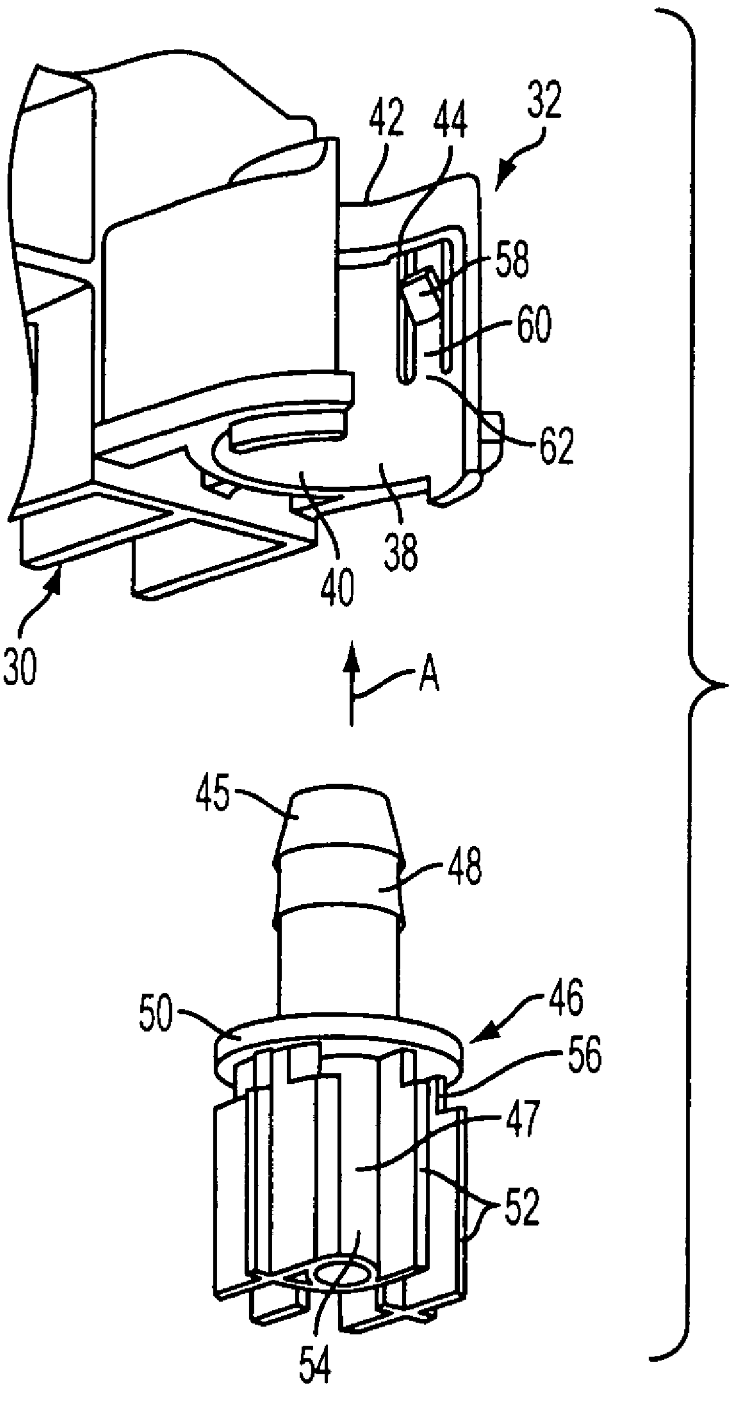
FIG. 3 is an enlarged exploded view showing suction structure, with hose attached, about to be inserted into the mounted structure of FIG. 2.

With reference to FIG. 3, the mounting structure 32 includes a generally cylindrical wall structure 38 having a generally C-shaped configuration with an opened first end 40 and an opened second end 42 that is spaced from the first end 40. A stop surface 44 is provided in the wall structure 38 near the second end 42 to control the location of a suction structure, generally indicated at 46, when inserted into the mounting structure 32, as will be explained more fully below.

Figure 4:
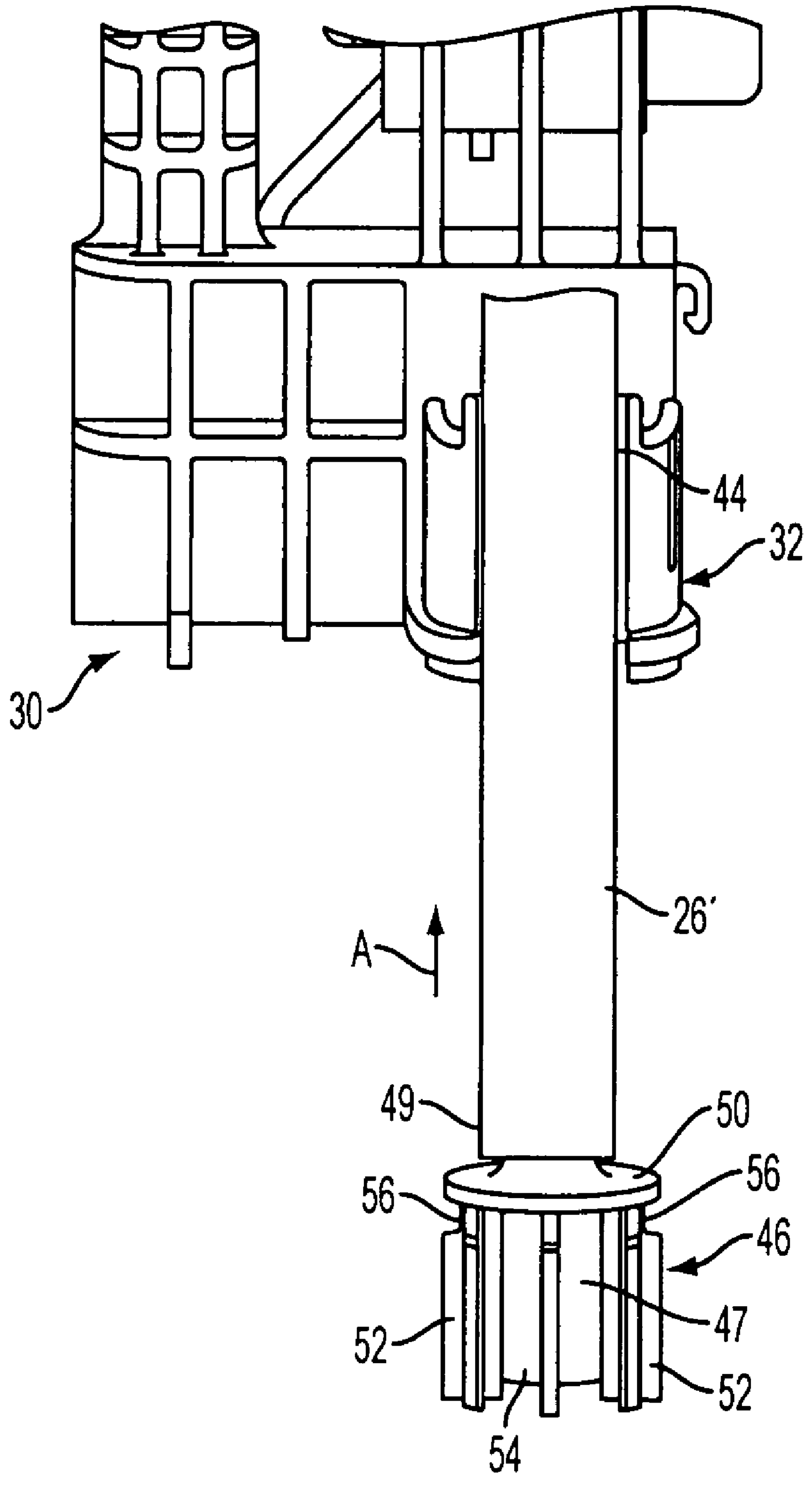
FIG. 4 is an enlarged exploded view showing suction structure, without hose attached, about to be inserted into the mounted structure of FIG. 2.
Figure 5:
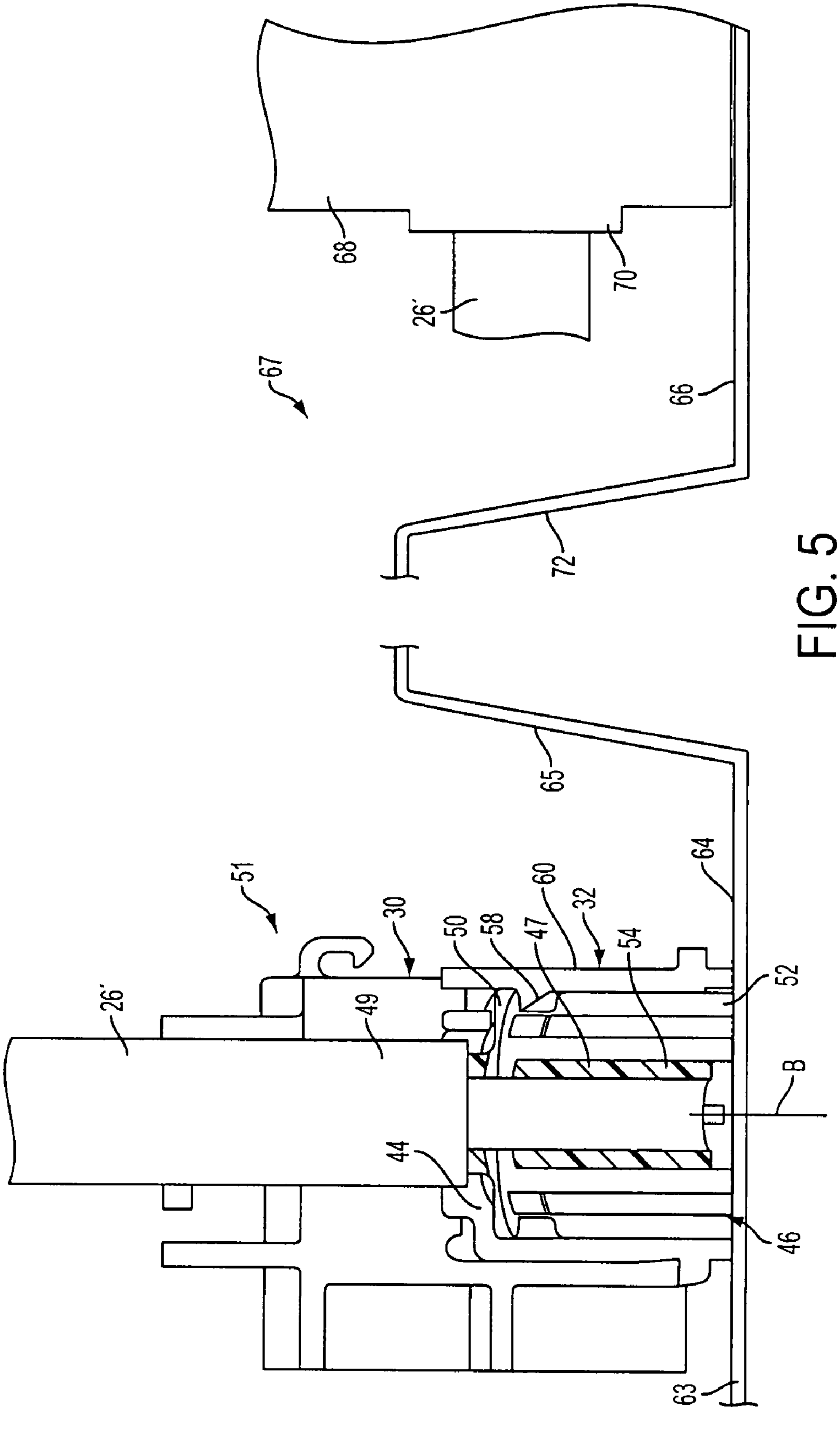
FIG. 5 is a partial sectional view of the suction structure of FIG. 3, with a hose attached, shown fully inserted into the mounting structure in a saddle-type fuel tank.

As best shown in FIGS. 3 and 5, the suction structure 46 includes a tube member 47 having a barbed fitting 48 at a first open end 45 that receives an end 49 of a hose 26' (FIG. 4). The other end of the hose 26' is coupled with the conventional jet pump 70 (FIG. 5) such that fuel can be drawn from an auxiliary portion of a fuel tank to the primary portion of the tank in the conventional manner discussed below. Below the barbed fitting 48, the suction structure 46 includes an annular rim 50 that engages the stop surface 44 of the mounting structure 32 when inserted into the mounting structure 32 (FIG. 5).

Baffle structure 52 surrounds the second open end 54 of the tube member 47. The baffle structure 52 is constructed and arranged to prevent debris in the fuel tank from entering the second open end 54. A portion of the baffle structure 52 has at least one recess 56 defined near the rim 50 that receives locking structure preferably in the form of a tab 58 (FIG. 5) of the mounting structure when inserted into the mounting structure. Thus, the tab 58 in the recess 56 prevents movement of the suction structure 46 along axis B (FIG. 5.) Each tab 58 is provided on a cantilevered arm member 60 that is fixed to the mounting structure 32 at only one end 62 (FIG. 3) thereof.

The suction structure 46 with hose 26' and the mounting structure 32 define a hose connection, generally indicated at 51. To assemble the hose connection 51, first, with reference to FIG. 5, a fuel pump assembly 68 with jet pump 70 is inserted into a primary portion 66 of a fuel tank 65. The hose 26', coupled with the jet pump 70, is guided across the hump 72 to the auxiliary portion 63. In the auxiliary portion, the hose 26' is grabbed and end 49 thereof is connected to the barbed fitting 48 of the suction structure 46. Thus, only one connection for hose 26' is needed and no quick connection is required.

With reference to FIG. 4, the suction structure 46 with hose 26' attached is moved upwardly in the direction of arrow A until the annular rim 50 engages the stop surface 44 of the mounting structure 32. The tabs 58 engage the recesses 56 to lock the suction structure 46 with respect to the mounting structure 32 so as to hold the suction structure 46 in place during assembly of the housing 30 into the auxiliary portion of the fuel tank. Although the suction structure 46 is secured to the mounting structure 32, the suction structure 46, with hose 26' attached, is free to rotate with respect to the mounting structure 32 about axis B (FIG. 5) of the suction structure 46 to avoid twisting forces that may be exerted on the hose 26'.

With reference to FIG. 5, once the housing 30 with attached suction structure 46 and attached hose 26' is assembled in an auxiliary portion 63 of a fuel tank, the baffles 52 engage a bottom 64 of the auxiliary portion 63 of the fuel tank such that the suction structure 46 cannot move further downwardly and thus is secured within the auxiliary portion 63 of the fuel tank 65.

As shown in FIG. 5 and noted above, in a fuel supply system generally indicated at 67, the primary portion 66 of the fuel tank 65 includes a fuel pump assembly 68 therein. The fuel pump assembly 68 is constructed and arranged to send fuel to a vehicle engine (no shown). The fuel pump assembly 68 includes the jet pump 70. The jet pump 70 creates a vacuum and draws fuel through the hose 26' from the auxiliary portion 63 to the primary portion 66 of the fuel tank 65.

For electrostatic dissipation, the suction structure 46 and the hose 26' can be of electrically conductive material and can be discharged to the primary portion 66 (e.g. at the jet pump 70).

Thus, the hose connection of the embodiment, provides a simple way of connecting a hose in an auxiliary portion of a tank to a jet pump in a primary portion of the tank such that the hose connection will not tangle or become disengaged. Conventional quick-connect connectors are not required with the hose connection.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A hose connection comprising:

mounting structure, suction structure having an axis the suction structure being mounted to the mounting, and a hose coupled to the suction structure, wherein the mounting structure has a resilient locking structure and the suction structure includes surfaces defining at least one recess, the locking structure being engaged with the recess to limit axial movement of the suction structure while permitting the suction structure to rotate freely with respect to the mounting structure about the axis without substantial interference therebetween so as to avoid twisting forces that may be exerted on the hose, wherein the suction structure includes a tube member having first and second open ends, the first open end of the tube member being coupled with the hose, the second open end being constructed and arranged to rest on a bottom surface of a fuel tank.

2. The hose connection of claim 1, in combination with an auxiliary portion of the fuel tank, the second open end engaging a bottom of the auxiliary portion of the fuel tank.

3. The hose connection of claim 1, wherein the mounting structure has a generally cylindrical wall structure having an opened first end and an opened second end spaced axially from the first end.

4. The hose connection of claim 3, wherein a stop surface is provided in the wall structure near the second end, the suction structure including a rim, the rim engaging the stop surface.

5. The hose connection of claim 1, wherein the locking structure includes a tab at an end of a cantilevered arm member of the mounting structure.

6. The hose connection of claim 1, wherein the first open end of the tube member includes a barbed fitting coupled with the hose.

7. The hose connection of claim 1, wherein baffle structure surrounds the second open end of the tube member, the baffle structure being constructed and arranged to prevent debris from entering the second open end of the tube member.

8. The hose connection of claim 1, wherein the mounting structure is part of a housing, the housing being constructed and arranged to be received in an auxiliary portion of a fuel tank, the fuel tank having the auxiliary portion and a primary portion.

9. The hose connection of claim 8, wherein the housing includes a level sensor mounted thereto.

10. The hose connection of claim 1, wherein the hose and the suction structure include electrically conductive material.

11. A fuel supply system comprising:

a fuel tank having a primary portion and an auxiliary portion, a fuel pump assembly in the primary portion, the fuel pump assembly including a jet pump, mounting structure in the auxiliary portion, suction structure having an axis and first and second ends, the suction structure being mounted to a bottom portion of the mounting structure, and a hose coupled at one end thereof to the first end of the suction structure and coupled at another end to the jet pump such that fuel in the auxiliary portion of the fuel tank can be drawn by the jet pump through the suction structure and hose to the primary portion of the fuel tank, wherein the mounting structure has a resilient locking structure and the suction structure includes surfaces defining at least one recess, the locking structure being engaged with the recess to prevent axial movement of the suction structure, and wherein the suction structure is mounted to the mounting structure such that the suction structure can rotate freely, with respect to the mounting structure, about the axis without substantial interference there-between so as to avoid twisting forces that may be exerted on the hose and wherein the second end of the suction structure engages a bottom of the auxiliary portion of the fuel tank.

12. The fuel supply system of claim 11, wherein the mounting structure has a generally cylindrical wall structure having an opened first end and an opened second end spaced from the first end.

13. The fuel supply system of claim 12, wherein a stop surface is provided in the wall structure near the second end, the suction structure including a rim, the rim engaging the stop surface.

14. The fuel supply system of claim 11, wherein the locking structure includes a tab at an end of a cantilevered arm member of the mounting structure.

15. The fuel supply system of claim 11, wherein the suction structure includes a tube member with the first and second ends being open ends.

16. The fuel supply system of claim 11, wherein the first open end of the tube member includes a barbed fitting coupled with the hose.

17. The fuel supply system of claim 11, wherein baffle structure surrounds the second open end of the tube member, the baffle structure being constructed and arranged to prevent debris from entering the second open end of the tube member.

18. The fuel supply system of claim 11, wherein the mounting structure is part of a housing, the housing being disposed in the auxiliary portion of a fuel tank, the housing including a level sensor mounted thereto.

* * * * *